US012736203B1

(12) United States Patent
Qu

(10) Patent No.: US 12,736,203 B1
(45) Date of Patent: Sep. 15, 2026

(54) CHAIN-SHAPED DECORATIVE LAMP

(71) Applicant: Haixia Qu, Taizhou (CN)

(72) Inventor: Haixia Qu, Taizhou (CN)

(73) Assignee: Haixia Qu, Taizhou (CN)

( * ) Notice: Subject to any disclaimer, the term of this patent is extended or adjusted under 35 U.S.C. 154(b) by 0 days.

(21) Appl. No.: 19/268,977

(22) Filed: Jul. 14, 2025

(30) Foreign Application Priority Data

Jun. 9, 2025 (CN) ......................... 202521172634.5

(51) Int. Cl.

| | |
|---|---|
| ***F21V 17/00*** | (2006.01) |
| ***F21S 4/28*** | (2016.01) |
| ***F21V 17/16*** | (2006.01) |
| ***F21V 19/00*** | (2006.01) |
| *F21Y 103/33* | (2016.01) |

(52) U.S. Cl.
CPC .............. *F21V 17/002* (2013.01); *F21S 4/28* (2016.01); *F21V 17/162* (2013.01); *F21V 19/0035* (2013.01); *F21V 19/004* (2013.01); *F21Y 2103/33* (2016.08)

(58) Field of Classification Search
CPC .... F21V 17/002; F21V 17/16; F21V 19/0035; F21V 19/004; F21S 4/00; F21S 4/10; F21S 4/28
See application file for complete search history.

(56) References Cited

U.S. PATENT DOCUMENTS

| | | | | |
|---|---|---|---|---|
| 6,196,701 | B1 * | 3/2001 | Chang | F21S 4/20 362/249.16 |
| 11,802,682 | B1 * | 10/2023 | Choy | F21V 3/02 |
| 2004/0031287 | A1 * | 2/2004 | Leason | A44C 15/0015 63/1.13 |
| 2004/0233668 | A1 * | 11/2004 | Telfer | F21S 4/10 362/249.16 |
| 2005/0185400 | A1 * | 8/2005 | Hsu | F21S 4/10 362/807 |
| 2010/0135024 | A1 * | 6/2010 | Gier | F21S 4/10 362/294 |
| 2021/0381679 | A1 * | 12/2021 | Künzler | F21V 21/26 |

FOREIGN PATENT DOCUMENTS

| | | |
|---|---|---|
| CN | 215808335 U | 2/2022 |

* cited by examiner

*Primary Examiner* — Christopher E Dunay
(74) *Attorney, Agent, or Firm* — FIDELI LAW PLLC

(57) ABSTRACT

A chain-shaped decorative lamp is provided, and aims to provide a chain-shaped decorative lamp with good installation flexibility. According to main points of technical solutions, the chain-shaped decorative lamp includes an annular body and a lamp string disposed in the annular body. The annular body includes an upper housing and a lower housing that are detachably connected to each other. A plurality of pairs of limited posts are disposed in the upper housing. Each pair of limited posts forms a clamping gap. A lamp strip on the lamp string is clamped into the clamping gap, so that a bead on the lamp string is fastened into the upper housing. A support column corresponding to each clamping gap is disposed in the lower housing.

6 Claims, 3 Drawing Sheets

CHAIN-SHAPED DECORATIVE LAMP

RELATED APPLICATIONS

The present patent document claims the benefit of priority to patent application No. 202521172634.5, filed Jun. 9, 2025, and entitled "CHAIN-SHAPED DECORATIVE LAMP," the entire contents of each of which are incorporated herein by reference.

BACKGROUND

1. Technical Field

The present disclosure relates to the field of decorative lamp technologies, and more specifically, to a chain-shaped decorative lamp.

2. Background Information

With improvement of living standards of people and continuous improvement of pursuit of life quality of people, decorative lamps are increasingly widely used in various scenarios such as a home, a business place, and a festival celebration. Decorative lamps play a vital role in the construction of a warm and romantic home environment or a buoyant business environment. Not only does consumer demand for decorative lamps continue to increase in quantity, but also consumers put forward higher requirements in quality, design, and function.

Most of traditional decorative lamps are constant and conventional in modeling, and are short of innovation and uniqueness. Common circular, square and spherical decorative lamps are seen everywhere in the market, which makes consumers feel tired. In an era of pursuing individuality and differentiation, this single-styled decorative lamp is difficult to meet requirements of consumers for unique decorative effects.

BRIEF SUMMARY

In view of disadvantages in the prior art, an object of the present disclosure is to provide a chain-shaped decorative lamp with good installation flexibility.

To implement the following object, the present disclosure provides the following technical solutions. A chain-shaped decorative lamp includes an annular body and a lamp string disposed in the annular body. The annular body includes an upper housing and a lower housing that are detachably connected to each other. A plurality of pairs of limited posts are disposed in the upper housing. Each pair of limited posts forms a clamping gap. A lamp strip on the lamp string is clamped into the clamping gap, so that a bead on the lamp string is fastened into the upper housing. A support column corresponding to each clamping gap is disposed in the lower housing. When the upper housing and the lower housing are buckled, the support column is disposed above the clamping gap to prevent the lamp strip from being separated from the clamping gap.

The present disclosure is further disposed as follows. Each of one end of the upper housing and one end of the lower housing is provided with a chain joint. When two adjacent annular bodies are connected, the upper housing and the lower housing respectively pass through the closed annular body by using the chain joint, and are fastened together oppositely.

The present disclosure is further disposed as follows. Grooves are further disposed at both ends of the upper housing and the lower housing. After the upper housing and the lower housing are buckled, the two grooves form a through hole for the lamp strip to pass through, and two adjacent annular bodies limit a moving distance by using the lamp strip outside the housing.

The present disclosure is further disposed as follows. A jack is disposed in the lower housing. An insertion pin adapted to the jack is disposed in the upper housing. The annular body is formed after the jack and the insertion pin are buckled.

The present disclosure is further disposed as follows. The width of the chain joint is ⅓-½ of the width of the clamping gap.

The present disclosure is further disposed as follows. The diameter of the support column is 1.2 to 1.5 times the width of the clamping gap.

The present disclosure is further disposed as follows. The height of the bead is greater than the width of the clamping gap.

The present disclosure is further disposed as follows. Styling holes are disposed at corresponding positions of the upper housing and the lower housing.

The present disclosure has the following beneficial effects.

1. The annular body is composed of an upper housing and a lower housing that are detachable, so that installation of the lamp string becomes very simple. The workers or users simply need to clamp the lamp strip on the lamp string into the clamping gap formed by each pair of limited posts in the upper housing, so that a position of the lamp bead can be fixed preliminarily. Compared with traditional complex wiring and fixing modes, this operation is more intuitive and convenient, which greatly shortens the installation time and reduces the installation difficulty. This operation can be easily completed by ordinary users without professional installation experience. A clamping gap formed by several pairs of limited posts disposed inside the upper housing can tightly clamp the lamp strip on the lamp string, so that the bead is stably fastened into the upper housing. When the upper housing and the lower housing are buckled, the support column can be disposed above the clamping gap, which further enhances a fastening effect on the lamp strip, forms double insurance, prevents the lamp strip from being separated from the clamping gap more effectively, improves fastening reliability of the lamp string, and prolongs the service life of the decorative lamp.

2. The chain joints disposed at one end of the upper housing and one end of the lower housing enable connection of two adjacent annular bodies to become extremely simple and convenient. A connection operation can be quickly completed by respectively enabling the upper housing and the lower housing to pass through the closed annular body by means of the chain joint, and then oppositely buckling the upper housing and the lower housing. In this connection manner, assembly efficiency is greatly improved without additional complex tools or cumbersome steps, and time and energy can be saved. An integral chain structure is formed after a plurality of annular bodies are connected in sequence by using the chain joints. This structure has better mechanical performance, can disperse and bear a larger external force. Compared with a single independent decorative lamp, the chain-shaped integral structure is firmer and more durable, and can adapt to more complex use environments and conditions, thereby prolong the service life of the decorative lamp.

3. The grooves at both ends of the upper housing and the lower housing form the through hole for the lamp strip to pass through after being buckled. This provides a clear and regular path for the wiring of the lamp strip. During installation, the user can easily connect the lamp strip to each annular body through these through holes orderly to avoid random winding and disorder of the lamp strip. The two adjacent annular bodies limit a moving distance by using the lamp strip outside the housing, which effectively avoids excessive separation between the annular bodies. During daily use, even if the decorative lamp is pulled or swung by a certain external force, the lamp strip can play a restriction role, so that the adjacent annular bodies are kept within a proper distance range, thereby ensuring that the entire decorative lamp is not deformed or damaged due to excessive movement of a certain annular body. The width of the chain joint is ⅓-½ of the width of the clamping gap, and the proper width of the chain joint can provide enough frictional force and clamping force after passing through the annular body, so as to prevent the lamp strip between adjacent annular bodies from falling off during daily use, for example, when the decorative lamp is slightly shaken, blown, or touched artificially, which causes damage to the lamp strip, shortens the overall service life, and ensures stability and integrity of the chain-shaped structure.

4. The diameter of the support column is 1.2 to 1.5 times the width of the clamping gap, and the diameter of the support column is magnified to a certain extent relative to the clamping gap, so that not only can the lamp strip be clamped in the clamping gap to prevent running out during use, but also more powerful supporting force can be provided for the whole annular body. When the annular body is subjected to pressure, the thicker support column can disperse the pressure to the whole structure more uniformly. The jack of the lower housing is adapted to the insertion pin of the upper housing. After the upper housing and the lower housing are buckled, the annular body is formed, which provides a simple and firm connection manner for assembling the decorative lamp. During installation, the worker or the user only need to correctly insert the insertion pin into the jack, so that connection between the upper housing and the lower housing can be quickly completed without additional tools or complex operation steps, and assembly efficiency is greatly improved. The height of the bead is greater than the width of the clamping gap, which further restricts running of the bead in the annular body. Styling holes are disposed at corresponding positions of the upper housing and the lower housing, so that pursuing of different users for beauty and individuality can be met. When lamplight is emitted through styling holes, a unique light and shadow effect can be formed in a surrounding environment, thereby creating different atmospheres such as romance, warmth, and dreaminess.

Figure 1:
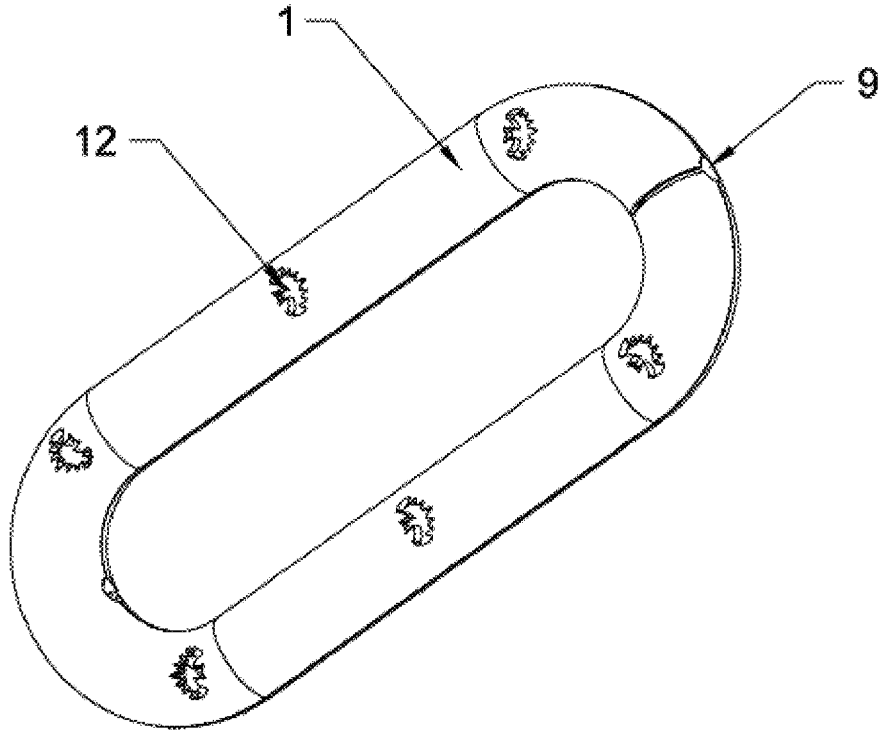
FIG. 1 is a schematic diagram of a solid structure according to the present disclosure.
Figure 2:
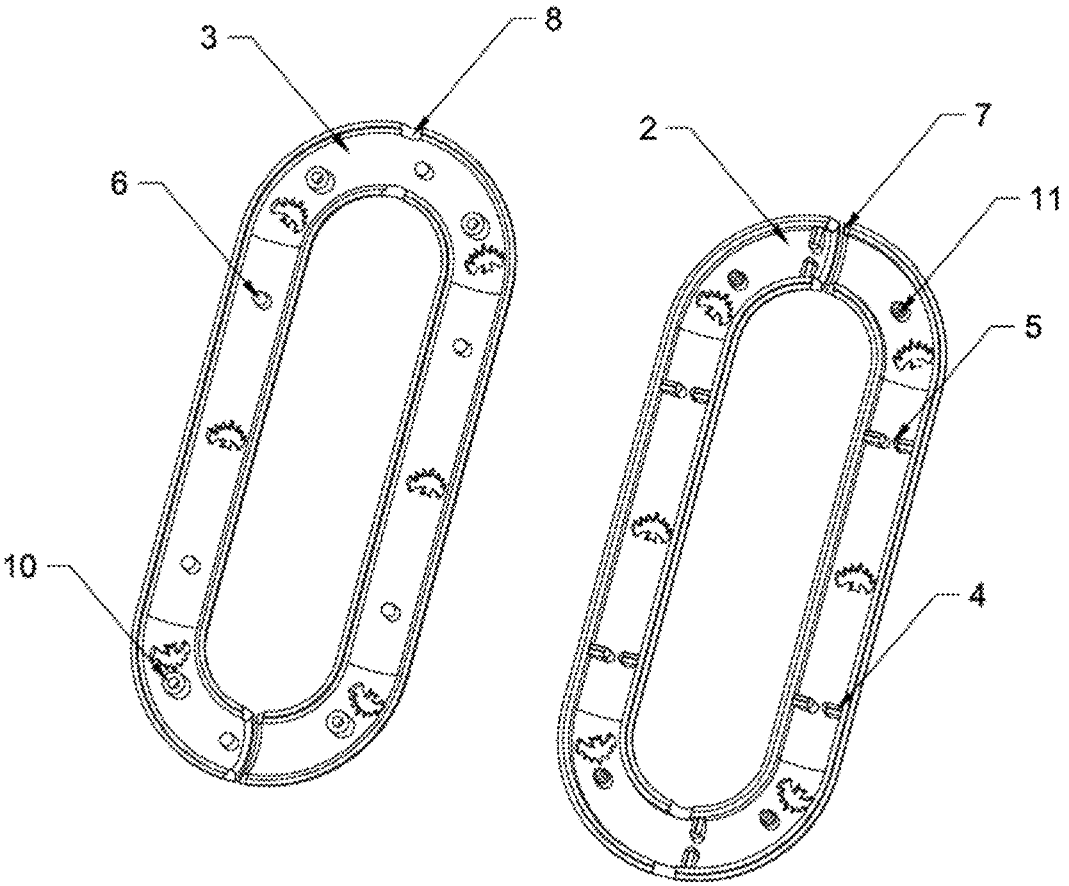
FIG. 2 is a structural diagram of an upper housing and a lower housing.
Figure 3:
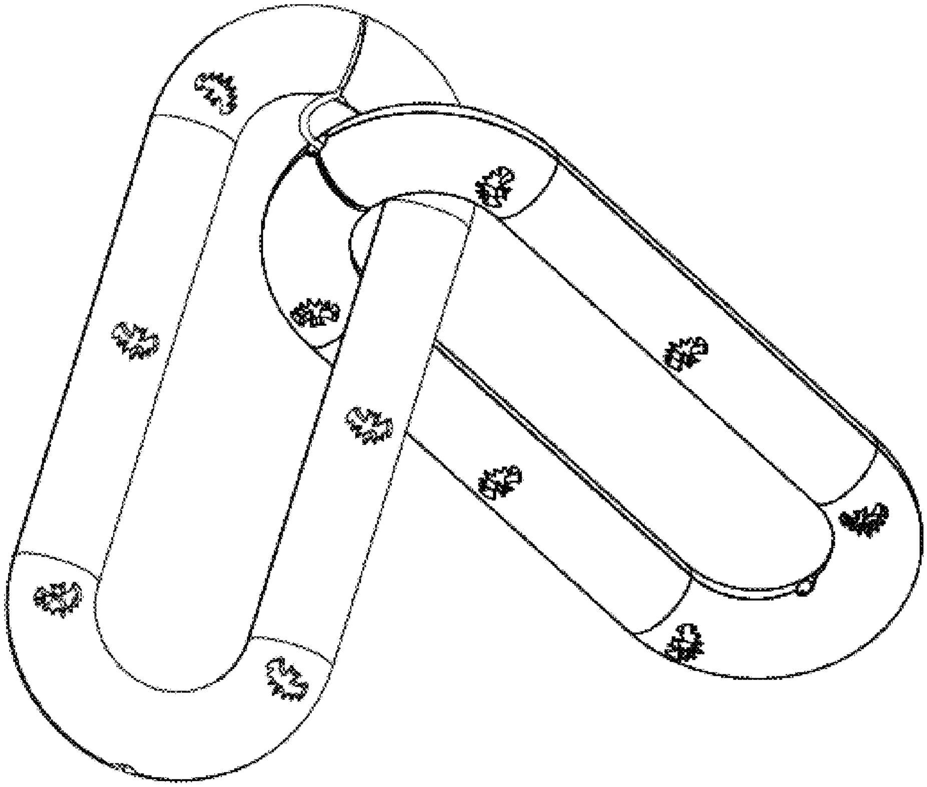
FIG. 3 is a diagram of a using state according to the present disclosure.

Reference signs in FIG. 1 to FIG. 3: 1: annular body; 2: upper housing; 3: lower housing; 4: limited post; 5: clamping gap; 6: support column; 7: chain joint; 8; groove; 9; through hole; 10: jack; 11: insertion pin; and 12: styling hole.

DETAILED DESCRIPTION OF THE DRAWINGS AND THE PRESENTLY PREFERRED EMBODIMENTS

Embodiments of the present disclosure are further described referring to FIG. 1 to FIG. 3.

For ease of illustration, spatially relative terms such as "upper", "lower", "left" and "right" are used in the embodiments to illustrate the relationship of one element or feature relative to another element or feature shown in the figures. It should be understood that the spatially relative terms are intended to include different orientations in use or operation in addition to the orientation of the device described in the figures. For example, if the device in the figures is inverted, elements recited as being "under" other elements or features are located "on" other elements or features. Therefore, the exemplary term "lower" may include both upper and lower orientations. The device may also be located in other different ways (rotating by 90 degrees or at other orientations), and the spatially relative descriptions used herein are explained accordingly.

Moreover, relational terms such as "first" and "second" are only used to distinguish component with the same name from one another, and do not necessarily require or imply that any actual relationship or sequence exists between these components.

A chain-shaped decorative lamp as shown in FIG. 1 to FIG. 3 includes an annular body 1 and a lamp string disposed in the annular body 1. The annular body 1 includes an upper housing 2 and a lower housing 3 that are detachably connected to each other. A plurality of pairs of limited posts 4 are disposed in the upper housing 2. Each pair of limited posts 4 forms a clamping gap 5. A lamp strip on the lamp string can be tightly clamped, and a bead is stably fastened into the upper housing 2, so that the installation of the lamp string becomes very simple. The worker or the user only need to clamp the lamp strip on the lamp string into the clamping gap 5 formed by each pair of limited posts 3 inside the upper housing 2, so that the position of the bead can be fixed preliminarily. Compared with traditional complex wiring and fixing modes, this operation is more intuitive and convenient, which greatly shortens the installation time and reduces the installation difficulty. This operation can be easily completed by ordinary users without professional installation experience. A support column 6 corresponding to each clamping gap 5 is disposed in the lower housing 3. When the upper housing 2 and the lower housing 3 are buckled, the support column 6 can be disposed above the clamping gap 5, which further enhances a fastening effect on the lamp strip, forms double insurance, prevents the lamp strip from being separated from the clamping gap 5 more effectively, improves fastening reliability of the lamp string, and prolongs the service life of the decorative lamp.

The chain joints 7 disposed at one end of the upper housing 2 and one end of the lower housing 3 enable connection of two adjacent annular bodies 1 to become extremely simple and convenient. A connection operation can be quickly completed by respectively enabling the upper housing 2 and the lower housing 3 to pass through the closed annular body 1 by means of the chain joint 7, and then oppositely buckling the upper housing 2 and the lower housing 3. In this connection manner, assembly efficiency is greatly improved without additional complex tools or cumbersome steps, and time and energy can be saved. An integral chain structure is formed after a plurality of annular bodies 1 are connected in sequence by using the chain joints 7. This structure has better mechanical performance, can disperse and bear a larger external force. Compared with a single independent decorative lamp, the chain-shaped integral structure is firmer and more durable, and can adapt to more complex use environments and conditions, thereby prolong the service life of the decorative lamp.

Grooves 8 are further disposed at both ends of the upper housing 2 and the lower housing 3. After the upper housing 2 and the lower housing 3 are buckled, the two grooves 8 form a through hole 9 for the lamp strip to pass through. This provides a clear and regular path for the wiring of the lamp strip. During installation, the user can easily connect the lamp strip to each annular body 1 through these through holes 9 orderly to avoid random winding and disorder of the lamp strip. The two adjacent annular bodies 1 limits a moving distance by using the lamp strip outside the housing, which effectively avoids excessive separation between the annular bodies 1. During daily use, even if the decorative lamp is pulled or swung by a certain external force, the lamp strip can play a restriction role, so that the adjacent annular bodies 1 are kept within a proper distance range, thereby ensuring that the entire decorative lamp is not deformed or damaged due to excessive movement of a certain annular body 1.

A jack 10 is disposed in the lower housing 3. An insertion pin 11 adapted to the jack 10 is disposed on the upper housing 2. After the upper housing 2 and the lower housing 3 are buckled, the annular body 1 is formed, which provides a simple and firm connection manner for assembling the decorative lamp. During installation, the worker or the user only need to correctly insert the insertion pin 11 into the jack 10, so that connection between the upper housing 2 and the lower housing 3 can be quickly completed without additional tools or complex operation steps, and assembly efficiency is greatly improved.

When the width of the chain joint 7 is less than ⅓ of the width of the clamping gap 5, it is difficult for the chain joint 7 to accurately pass through the annular body 1 during installation of the adjacent annular bodies 1. More time and energy are required to align and operate the chain joint 7, and installation efficiency is greatly reduced, and damage may be caused to the housing. When the width of the chain joint 7 is greater than ½ of the width of the clamping gap 5, the chain-shaped structure may look like too loose and rough, which affects the overall feeling of the decorative lamp visually. The lamp strip may also be stuck at a chain port or run out. During use, if vibration occurs, damage may be caused to the lamp strip stuck at the chain port, which affects lighting. Therefore, when the width of the chain joint 7 is the ⅓-½ of the clamping gap 5 optimally, the appropriate width of the chain joint 7 can provide enough frictional force and clamping force after passing through the annular body 1, so as to prevent the lamp strip between adjacent annular bodies 1 from falling off during daily use, for example, when the decorative lamp is slightly shaken, blown, or touched artificially, which causes damage to the lamp strip, shortens the overall service life, and ensures stability and integrity of the chain-shaped structure.

When the diameter of the support column 6 is smaller than 1.2 times the width of the clamping gap 5, the frictional force between the support column 6 and the clamping gap 5 is reduced, and it is difficult to form a stable fastening effect. Moreover, when the annular body 1 is vibrated, the lamp strip may run out from the clamping gap 5 to affect a lighting effect. When the diameter of the support column 6 is greater than 1.5 times the width of the clamping gap 5, the support column 6 with excessive diameter may look lofty, and has an imbalanced ratio with the annular body 1 and other components, which destroys the attractive appearance of the whole decorative lamp. The decorative lamp looks heavy, and the manufacturing cost is increased. Therefore, the diameter of the support column is 1.2 to 1.5 times the width of the clamping gap optionally, and the diameter of the support column is magnified to a certain extent relative to the clamping gap 5, so that not only can the lamp strip be clamped in the clamping gap 5 to prevent running out during use, but also more powerful supporting force can be provided for the whole annular body 1. When the annular body 1 is subjected to pressure, the thicker support column 6 can disperse the pressure to the whole structure more uniformly.

The height of the bead is greater than the width of the clamping gap 5, so that running of the bead in the annular body 1 can be further limited, so as to prevent the bead from being pulled out when a pull occurs, thereby destroying an original molding effect.

Styling holes 12 are disposed at corresponding positions of the upper housing 2 and the lower housing 3, so that pursuing of different users for beauty and individuality can be met. When lamplight is emitted through styling holes 12, a unique light and shadow effect can be formed in a surrounding environment, thereby creating different atmospheres such as romance, warmth, and dreaminess.

The foregoing lamp string in the present disclosure is a leather lamp.

The foregoing descriptions are merely better embodiments of the present disclosure, but are not intended to limit the present disclosure. Common variation and replacement made by those skilled in the art within the scope of the technical scheme of the present disclosure should be included in the protection scope of the present disclosure.

What is claimed is:

1. A chain-shaped decorative lamp, comprising an annular body (1) and a lamp string disposed in the annular body (1), wherein the annular body (1) comprises an upper housing (2) and a lower housing (3) that are detachably connected to each other, a plurality of pairs of limited posts (4) are disposed in the upper housing (2), each pair of limited posts (4) forms a clamping gap (5), a lamp strip on the lamp string is clamped into the clamping gap (5), so that a bead on the lamp string is fastened into the upper housing (2), a support column (6) corresponding to each clamping gap (5) is disposed in the lower housing (3), and when the upper housing (2) and the lower housing (3) are buckled, the support column (6) is disposed above the clamping gap (5) to prevent the lamp strip from being separated from the clamping gap (5), each of one end of the upper housing (2) and one end of the lower housing (3) is provided with a chain joint (7), and when two adjacent annular bodies (1) are connected, the upper housing (2) and the lower housing (3) respectively pass through the closed annular body (1) by using the chain joint (7), and are fastened together oppositely, grooves (8) are further disposed at both ends of the upper housing (2) and the lower housing (3), and after the upper housing (2) and the lower housing (3) are buckled, the two grooves (8) form a through hole (9) for the lamp strip to pass through, and two adjacent annular bodies (1) limit a moving distance by using the lamp strip outside the housing.

2. The chain-shaped decorative lamp according to claim 1, wherein a jack (10) is disposed in the lower housing (3), an insertion pin (11) adapted to the jack (10) is disposed in the upper housing (2), and the annular body (1) is formed after the jack (10) and the insertion pin (11) are buckled.

3. The chain-shaped decorative lamp according to claim 1, wherein the width of the chain joint (7) is ⅓-½ of the width of the clamping gap (5).

4. The chain-shaped decorative lamp according to claim 1, wherein the diameter of the support column (6) is 1.2 to 1.5 times the width of the clamping gap (5).

5. The chain-shaped decorative lamp according to claim 1, wherein the height of the bead is greater than the width of the clamping gap (5).

6. The chain-shaped decorative lamp according to claim 1, wherein styling holes (12) are disposed at corresponding positions of the upper housing (2) and the lower housing (3).

* * * * *